2,857,236

ALGINATE DI-AMMONIUM PHOSPHATE COMPOSITIONS FOR TEXTILE PRINTING PASTES

Frank Habersberger, Franklin Square, and John E. Politi, Flushing, N. Y., assignors to Kelco Company, San Diego, Calif., a corporation of Delaware No Drawing. Application November 1, 1954
Serial No. 466,233

12 Claims. (Cl. 8—62)

This invention relates to alginate compositions; more particularly, to dry compositions capable of solution or dispersion in water and to aqueous dispersions or solutions of the dry compositions in which the alginate serves as a thickening agent. Such compositions are useful inter alia for thickening printing pastes employed in the printing of textiles. They are, however, also useful in other connections.

In the printing of textiles, the two most important processes are machine or roller printing and screen printing. In machine printing, a roller is employed which is engraved to form the pattern or design. The roller is coated with a dye dispersed in a suitable medium, the excess of which is then removed by a doctor blade from the high portions of the roller, leaving the dye only on the sunken, design portions. The treated roller is then applied under pressure to the textile to transfer the design thereto.

In screen printing, a cloth screen or stencil is employed with blank areas coated to prevent penetration. The dye, dispersed in a suitable medium, is applied to the treated screen with a squeegee and it passes through the untreated areas (the design) onto the underlying textile.

Numerous dyes and pigments are available, depending upon such factors as the color desired and the material to be printed. It is common practice to incorporate a dye in a paste having certain desirable properties, such as flow properties and a sufficient viscosity to adhere to the design areas giving a sharp outline without running off into other areas. The paste should also be capable of being easily washed out of the textile with cold or hot water after the dye is fixed on the fabric.

Printing pastes which are commonly used for this purpose employ water as the vehicle and a thickening agent to produce the necessary thickness or viscosity. One class of thickening agent in common use today consists of the water-soluble alginates. These are well known and require no detailed description herein. They may be prepared from the alginic acid described in Clark and Green, U. S. Patent 2,036,922, or Green U. S. Patent 2,039,934. Further description appears in Jacobs, "Textile Printing," Chartwell House, 1952.

Pastes prepared with a water-soluble alginate as the thickening agent in accordance with prior practice, require the addition of a sequestering agent such as a molecularly dehydrated phosphate, e. g., sodium tetraphosphate (hereinafter referred to as STP) or sodium hexametaphosphate (SHMP). Such materials are added, among other reasons, for the purpose of imparting "long flow" characteristics, i. e., a viscosity and flow quality allowing the paste to flow freely enough for the purpose of dye application but not so freely as to allow the paste, when applied to a textile, to run over onto areas which are not intended to be printed. In distinction thereto, we have provided a method and composition of producing a paste having relatively shorter or improved flow characteristics but which will not plug the screen.

It is an object of the invention to provide improved alginate compositions, particularly for use in connection with printing pastes.

Another object of the invention is to provide alginate compositions in which the addition of a hygroscopic sequestering agent such as STP is unnecessary.

It is another object of the invention to provide a complete alginate composition which is sufficiently stable to be shipped and stored, which is non-hygroscopic, and which can be mixed with water to produce a paste of the proper consistency and with a dye and other adjuncts customarily employed with printing pastes, without requiring the textile printer to maintain a stock of a sequestering agent and other additives and to calculate the amount thereof to be added.

These and other objects will be apparent from the ensuing description and appended claims.

In accordance with the present invention, a small amount of di-ammonium phosphate (hereinafter referred to as DAP), of the order of 10% of the weight of anhydrous alginate, is added to and mixed with a water-soluble alginate, such as sodium alginate.

The composition of the invention may be a dry mix of water soluble alginate and DAP, with or without such additional ingredients as a preservative; or it may be an aqueous gum or thickener comprising water and the above-mentioned dry mix; or it may be a complete printing paste incorporating the above-mentioned aqueous gum or thickener, added water, a dye, and such other ingredients as may be desired or necessary.

Typical formulae of the invention are as follows:

*Example 1.—Dry formula (parts by weight)*

Sodium alginate _____ 3.6
DAP _____ 0.4
Preservative [1] _____ 0.1

[1] E. g. Dowicide A, a trademark of Dow Chemical Company of Midland, Michigan, for sodium o-phenylphenate or Vanicide 20 or 51, trademarks of R. T. Vanderbilt Company of New York, N. Y., for an amine salt of 2-mercaptobenzothiazole and sodium salts of dimethyl dithiocarbamic acid and 2-mercaptobenzothiazole.

*Example 2.—Aqueous thickener or gum (parts by weight)*

Dry formula of Example 1 _____ 4.1
Cold water _____ 95.9

*Example 3.—Insoluble azo dye paste for printing textiles (parts by weight)*

Insoluble azo dye _____ 3
Cellosolve _____ 3
40° Bé NaOH _____ 1.5–3
Hot water _____ 42.5–41
Thickener of Example 2 _____ 50

Other dye pastes can be prepared similarly and in accordance with known techniques, by using other dyes such as leuco vat esters, acid dyestuffs, direct dyestuffs, and acetate dyestuffs, etc., together with the usual adjuncts in accordance with known practice, which need not be described in detail herein.

The compounding of the formulae of Examples 1, 2, and 3 is simple and straightforward. In Example 1, the dry ingredients are mixed; in Example 2, the dry mix of Example 2 is added to cold water with agitation; and in Example 3 the dyestuff and other adjuncts are mixed with the thickener of Example 2 in accordance with standard procedure.

As mentioned above, DAP is preferably used in approximately the proportion of 10% of the weight of anhydrous alginate. However, greater or lesser proportions may be used, e. g., 5% to 20%. Ammoniated phosphoric acid having more ammonia than $(NH_4)_2HPO_4$ may be used, and if the paste or thickener is to be stored for a long period of time, then an excess of ammonia is preferred to make up for loss of ammonia during storage. It is also preferred to add ammonia solution (28%) in an amount up to ¼% by weight of the print paste in some instances where an alkaline or high pH paste is desirable.

Among the advantages of the alginate-DAP compositions of the present invention, there may be mentioned the following:

It is possible to produce printing pastes having a shorter flow without concomitant screen clogging. Also, it is not necessary to add the usual type of sequestering agent, such as STP or SHMP. It is these latter sequestering agents which are presently employed in connection with alginate dye paste thickeners and which result in the above-mentioned screen clogging if shorter flow characteristics are desired.

It is possible to provide the textile printer with a complete gum or thickener in which all the necessary ingredients are present except for the addition of water, the dye and other usual dye adjuncts. It is not necessary to stock such special agents as STP and SHMP.

Alginate-thickened printing pastes employing the alginate-DAP formula of the present invention have a wider field of application. For example, textile printing can be carried out on rainy days and fall-ons can be printed wet, which have been difficult heretofore with alginate-STP preparations because of the hygroscopic character of STP. Also, it is possible with the formula of the present invention to print Rapidogen dyes and other insoluble azo dyestuffs which are difficult to print with alginate-STP thickened pastes. The latter require the addition of ammonia gluconate or triethanolamine as buffers, which are not necessary with the alginate-DAP formula of the present invention.

Also with the formula of the present invention it is possible to print brighter, clearer colors; the paste is more stable; and it has less tendency to foam.

By "water-soluble alginates" as used herein and in the claims, is mean alginates, such as ammonium, sodium, potassium, magnesium alginates, the amines and alkylolamines, which can be used as thickeners for textile printing pastes.

We claim:

1. A composition of matter comprising a water-soluble alginate and approximately 5 to 20% based on the weight of alginate of di-ammonium phosphate.

2. A composition of matter comprising a water-soluble alginate of a type suitable for use as a thickener for a textile printing paste, and about 5 to 20% based on the weight of alginate of di-ammonium phosphate.

3. A composition of matter comprising a substantially dry mixture of a water-soluble alginate suitable as a thickener for textile printing pastes and di-ammonium phosphate, the alginate being present in major proportion and the di-ammonium phosphate being present in minor proportion of the order of 10% of the weight of alginate.

4. The composition of claim 3 wherein the alginate is sodium alginate.

5. An aqueous thickener suitable for thickening textile printing pastes, comprising water as the vehicle and predominant component and, dispersed therein, a water-soluble alginate in quantity sufficient to thicken the water and di-ammonium phosphate in small amount compared to the alginate.

6. The thickener of claim 5 wherein the alginate is sodium alginate.

7. The thickener of claim 6 wherein di-ammonium phosphate is present in the proportion of about 10% of the weight of alginate.

8. A textile printing paste thickener comprising at least about 90% of water, sodium alginate dissolved in the water in quantity sufficient to produce a thick paste, and di-ammonium phosphate in the proportion of about 10% of the alginate.

9. A textile printing paste comprising an aqueous vehicle, a dye, an alginate thickener and a small amount relatively to the alginate of di-ammonium phosphate.

10. A method of producing a thickener for a textile printing paste which comprises dissolving a water-soluble alginate in water in quantity sufficient to produce the desired viscosity and flow characteristics, and also dissolving in the same water di-ammonium phosphate in a quantity which is small compared to the alginate.

11. The method of claim 10, wherein the alginate is sodium alginate.

12. The method of claim 11, wherein the amount of di-ammonium phosphate is about 10% of the weight of alginate.

References Cited in the file of this patent

UNITED STATES PATENTS

| | | |
|---|---|---|
| 2,485,934 | Steiner | Oct. 25, 1949 |
| 2,665,211 | Roland | Jan. 5, 1954 |

OTHER REFERENCES

Amer. Dyestuff Reporter, for Nov. 28, 1938, pp. 716–721.

Melliand Textilberichte, for March 1950, pp. 194–196.